(No Model.)

W. M. SHIRA.
CHURN.

No. 404,569. Patented June 4, 1889.

WITNESSES:
John H. Seamor
C. Sedgwick

INVENTOR:
W. M. Shira
BY Munn & Co.
ATTORNEYS.

UNITED STATES PATENT OFFICE.

WILLIAM M. SHIRA, OF BUTLER, PENNSYLVANIA.

CHURN.

SPECIFICATION forming part of Letters Patent No. 404,569, dated June 4, 1889.

Application filed November 13, 1888. Serial No. 290,667. (No model.)

*To all whom it may concern:*

Be it known that I, WILLIAM M. SHIRA, of Butler, in the county of Butler and State of Pennsylvania, have invented a new and useful Improvement in Hand-Power Churns, of which the following is a full, clear, and exact description.

The object of my improvement is to provide a churn which may be worked while the operator is in either a standing or sitting position and which shall be simple and cheap in construction. I accomplish this by constructing a churn in the manner hereinafter set forth, and pointed out particularly in the claims.

Reference is to be had to the accompanying drawings, forming a part of this specification, in which similar letters of reference indicate corresponding parts in both the figures.

Figure 1:
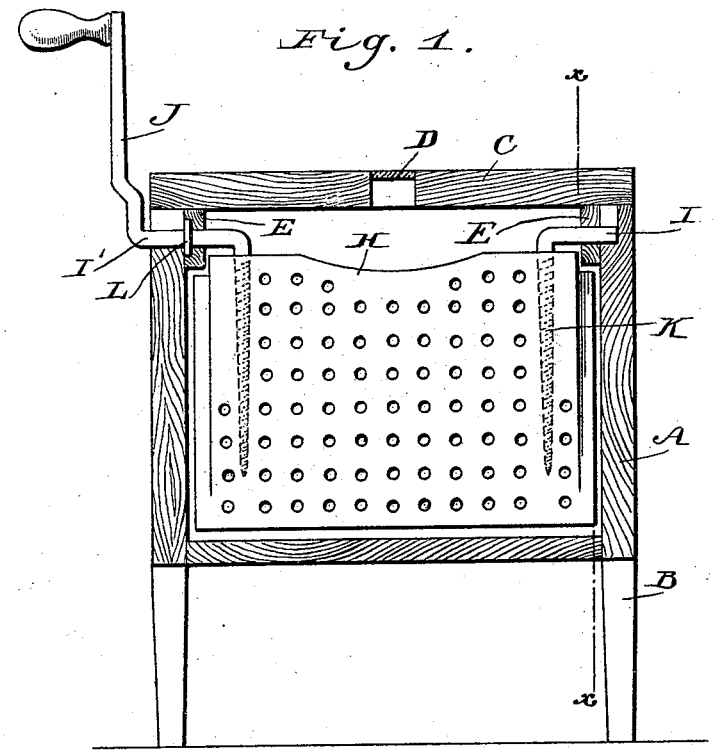
Figure 2:
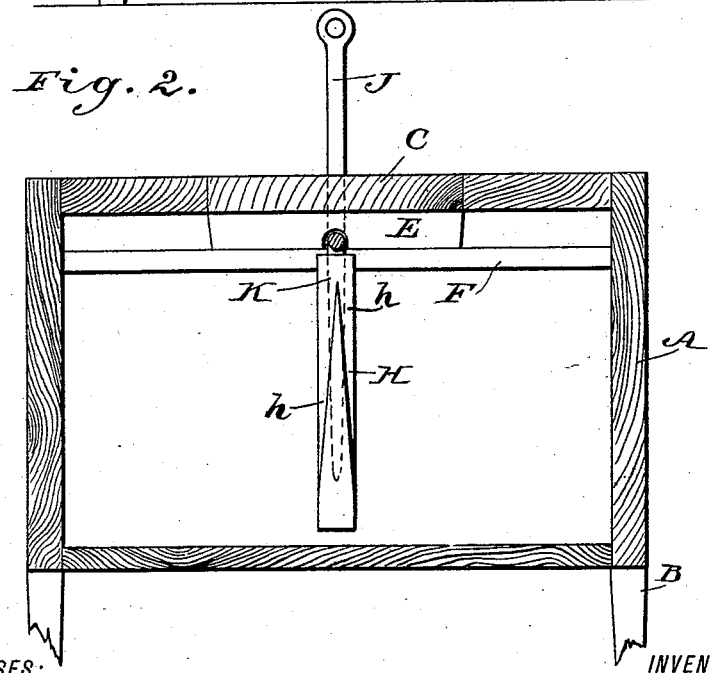

Figure 1 is a transverse sectional elevation of my improved churn, taken near the center thereof. Fig. 2 is a longitudinal sectional elevation taken on the plane of the line $x\ x$ of Fig. 1.

The body A of the churn may be of any desired shape. I have shown it in the drawings as rectangular and provided with legs B and a cover C. The cover C is provided near its middle with an aperture D, into which a glass plate is let for the purpose of enabling the interior of the churn to be inspected without removing the cover. The cover C may be of any desired construction and may be provided with a handle of any suitable kind, and I have shown its under surface as provided near its edges with a rib E of wood, which, when the cover is in place, rests upon a rib F, also of wood, placed on the sides of the body of the churn.

The dasher H is preferably of wood, and is perforated, as shown. It is suspended within the body of the churn by means of cranked dasher-arms I and I', the arm I' terminating in a handle J for the operator. The arms I and I' are rigidly secured to the dasher by means of a screw-thread cut on the portion K of the arms entering the dasher-board.

At one side of the body of the churn a bearing is formed for the arm I by cutting away about half the thickness of the board for a depth of about two inches and for a width just sufficient to permit the end of the arm I to enter. The bearing at the other side for the arm I' is formed by simply cutting entirely through a portion of the wall of the churn a slot of about the dimensions of the slot for the arm I, which will permit the handle of the arm I' to protrude, a washer L being located on the arm I' within the churn to close the slot and prevent the cream from splashing or spilling out.

The walls of the churn may be lined in any suitable manner, and the bearings for the arms I and I' may be lined with metal or porcelain.

The churn is operated by reciprocating the handle J, whereby the milk will be agitated by the dasher H, the perforations of which act to secure a complete separation.

To permit the dasher to be brought nearly to a horizontal position, the ends of the dasher are rabbeted at $h$, the rabbets meeting at the top of the dasher and vanishing toward the lower edge.

Having thus fully described my invention, I claim as new and desire to secure by Letters Patent—

1. In a churn, the combination, with a perforated dasher, of the angular supporting-arms I I', each of said arms having a threaded tapering member K, adapted to enter the dasher, the horizontal members resting in the sides of the body, and a handle J, attached to the arm I', substantially as shown and described.

2. In a churn, the combination, with a body, of a perforated dasher H, having rabbeted ends $h$, as shown, the angular supporting-arms I I', having the threaded tapering portion K, adapted to enter the dasher, and the horizontal portion journaled in slots formed in the sides of the box, and a handle J, formed integral with supporting-arm I', substantially as shown and described.

WILLIAM M. SHIRA.

Witnesses:
W. J. KRAMER,
A. M. CORNELIUS.